United States Patent Office 3,634,291
Patented Jan. 11, 1972

3,634,291
METHOD OF RECOVERING COBALT OR COBALT PLUS GROUP II METAL CATALYST IN OXO SYNTHESIS PROCESS
Seiji Usami, Kotaro Nishimura, and Takeo Koyama, Saitama, and Saburo Fukushi, Tokyo, Japan, assignors to Toa Nenryo Kogyo Kabushiki Kaisha, Tokyo, Japan
No Drawing. Filed Oct. 21, 1968, Ser. No. 769,375
Claims priority, application Japan, Oct. 21, 1967, 42/67,709; Dec. 27, 1967, 43/83,273
Int. Cl. B01j 11/02; C07c 45/02
U.S. Cl. 252—414      2 Claims

ABSTRACT OF THE DISCLOSURE

A method for recovering a reaction catalyst from an oxo or an Aldox process in which the waste catalyst-containing solution obtained by the decatalyzing step is treated with an organic extracting medium and an alkali metal hydroxide in order to obtain the catalyst metal or metals in the form of hydroxides suspended in the organic extracting medium.

BACKGROUND OF THE INVENTION

Field of the invention

This invention relates to a method for recovering a reaction catalyst in an oxo synthesis process for producing an aldehyde and/or alcohol from an olefinic compound and, more particularly, relates to a method for recovering a catalyst from a catalyst-containing solution separated at the time of the decatalyzing treatment of an oxo reaction product obtained by using an oxo reaction catalyst or an oxo reaction catalyst with a dimerization-dehydration reaction catalyst.

Description of the prior art

It is well known in the art that oxygenated organic compounds may be synthesized from organic compounds containing olefinic linkages by a reaction with carbon monoxide and hydrogen in the presence of catalyst-containing metals of the iron group in a two-stage process in which predominantly aldehydes and minor proportions of ketones and alcohols are formed in a first step in the presence of a carbonylation catalyst comprising metals of the iron group and particularly cobalt, and the products from the first step may then be hydrogenated in a second step to convert the organic carbonyl compounds containing one more carbon atom than the olefinic starting material to the corresponding alcohol. Likewise, if desired, the aldehydes may be converted to the corresponding fatty acids by oxidation. The second stage hydrogenation catalyst may comprise any known reduction catalyst such as metallic supported or unsupported nickel, copper chromite, sulfactive catalysts such as oxides and sulfides of tungsten, nickel and molybdenum and the like.

The carbonylation or oxo reaction, by which name this process is generally known, provides a particularly attractive method of preparing primary alcohols to supply the large market for plasticizers, detergents, solvents and the like. Usable in the reaction to a greater or lesser degree are long and short-chained olefinic compounds, not only hydrocarbons but most other organic compounds having a carbon-to-carbon olefinic linkage such an unsaturated alcohols, acids, esters and the like. Straight and branch-chained olefins such as propylene, butene, pentene, hexene, heptene, styrene, olefin polymers such as di- and tri-isobutylene, hexene and heptene dimers, polypropylenes, olefinic fractions from a hydrocarbon synthesis process, thermal or catalytic cracking operations. Other sources of hydrocarbon fractions containing such olefins may be used as starting materials depending on the nature of the final product desired. The synthesis gas mixture fed to the first stage may be any desired ratio of $H_2$ to CO, preferably within the limits of 0.5 to 2 volumes hydrogen per volume of carbon monoxide. The conditions for reacting olefins with the synthesis gases vary somewhat in accordance with the nature of the olefin feed, the reaction being generally conducted at pressures in the range of from about 1500 to 4500 p.s.i.g. and the ratio of synthesis gas to olefin may vary widely; in general, about 2,500 to 25,000 cubic feet of $H_2+CO$ per barrel (42 gallons) of olefin feed are employed.

The catalyst for the first stage of the process is usually employed in the form of an oil-soluble compound of the catalytically active carbonylation metal. Thus there have been employed the salts of the metals such as cobalt and high molecular weight fatty acids such as stearic, oleic, naphthenic, linoleic acids and the like. Water soluble catalysts, such as cobalt acetate, chloride, and the like, have also been suggested. Catalyst concentrations may vary from about 0.5 to 5.0% by weight of the catalyst salt based on the weight of the olefinic feed. The first stage or carbonylation reaction is generally carried out at temperatures in the range of from about 250° to 450° F. depending upon the nature of the olefin and other reaction conditions. In general, the lower olefins will react at lower temperatures and react to a greater extent than the high molecular weight olefins. The carbonylation reaction is an exothermic one, with a heat release of the same high order or magnitude as in the hydrocarbon synthesis process, about 35 to 50 Kcal./gram-mol olefinic double bond reacted and, therefore, careful temperature control is required in the reaction zone to prevent decomposition of cobalt carbonyl to metallic cobalt and also to prevent formation of secondary reaction products and undesired reactions, such as hydrogenation of the olefin, formation of hydrocarbon synthesis products, and the like. At 3000 p.s.i.g. (1500 p.s.i.g. CO partial pressure) cobalt carbonyl starts to decompose at an appreciable rate above 350° F., thus decreasing the concentration of the active catalyst. On the other hand, temperatures are preferably kept above 300° F. so as to keep the reaction rate up to a reasonable figure to insure high olefin conversions at reasonable feed rates.

It is also well known that, accompanying the main carbonylation reaction, i.e., the reaction wherein an olefin is converted to an aldehyde having one more carbon atom, there is formed a large number of secondary reaction products, such as esters, aldols, polymers, ketones and the like, but, by the addition of a reaction modifier or a dimerization-dehydration catalyst, the aldehyde synthesis reaction is directed into a completely new channel and there is formed, in high yields, a primary alcohol product having $2n+2$ carbon atoms, where an olefin with $n$ carbon atoms is passed to the carbonylation zone. Accompanying this reaction is the normal aldehyde synthesis reaction producing aldehydes and alcohols having $n+1$ carbon atoms. Other secondary reaction products are substantially absent. The normal reaction product also is formed but to a substantially smaller extent than is the case when the reaction modifier is absent. By this process, called conventionally the Aldox process, high molecular weight alcohols may be produced from low molecular weight olefins by the carbonylation reaction, followed by hydrogenation, when the carbonylation stage is conducted in the presence of dimerization-dehydration catalysts comprising Group II metals of the Periodic Table, such as zinc or magnesium compounds.

The process itself is the same, except for the use of reaction modifiers mentioned above, as the conventional oxo process. The zinc and other Group II metal compounds are salts of fatty acids, oxides, hydroxides, carbonates, and also metallic salts of cobalt hydrocarbonyl. These may be added either in solution or as solids from a pressurized hopper. The solution method employs one or a combination of water, olefin feed, or reaction product as the solvent, while the hopper method of addition permits the use of normally insoluble compounds such as oxides and carbonates and plain metal.

In accordance with the usual Aldox process, therefore, there is passed into the first-stage reaction zone, along with the olefin, carbon monoxide, hydrogen, a cobalt carbonylation catalyst and a reaction modifier, preferably zinc. Although the latter may be added as a metal or as an insoluble compound, such as the oxide or carbonate, preferably it is added in solution as a salt that is soluble in the reactants or reagents. Although cobalt may be added in any form, because the active catalytic agent is the hydrocarbonyl which is synthesized in the course of the reaction and which is soluble in the olefin-aldehyde mixture, zinc does not form a carbonyl and, hence, to derive the benefits associated with a homogeneous reaction system, an oil-soluble form of zinc, such as zinc oleate, is a particularly desirable reaction modifier.

The purpose of the present invention is to recover the oxo reaction catalyst or carbonylation catalyst at higher yields and in the most active form and to supply it again to an oxo reaction.

In the aldehyde product of the oxo process or the Aldox process as above described, the oxo reaction catalyst may be converted so as to be present not only in the state of a metal carbonyl, which is its active form, but also in the state of an organic acid salt, organic complex salt or simple metallic form. But mostly it is dissolved as a metal carbonyl. The aldehyde product containing, for example, dissolved cobalt carbonyl (and zinc salts, if they are present) is sent to a catalyst decomposition or decobalting zone, where in the presence of heat and steam, water, or dilute organic acid, the inorganic contaminants are removed from the aldehyde product in a manner known in the art. The aldehyde product, substantially completely free of inorganic compounds, is then hydrogenated under conventional conditions to make alcohols and the alcohol product is fractionated to produce the $n+1$ alcohols or both the $n+1$ and the $2n+2$ alcohols, as above described.

Thus, the dissolved catalyst can be removed from the reaction product by a process wherein the reaction product is heated under a hydrogen pressure, a process wherein steam is blown in under atmospheric pressure, a process wherein the reaction product is heated together with the addition of an inorganic acid or an organic acid, or a process wherein it is decomposed with an oxidizing agent. The removed catalyst may be disposed of as waste, or it can be recovered and again supplied to the reaction, as required. There are already known many methods of recovering catalysts. For example, in case the waste catalyst after the decatalyzing treatment, such as above described, is in the form of a simple metal or metallic oxide, after it is separated by a method such as filtration or centrifugal separation, it must be converted to be in a catalyst form in which it can be introduced into an oxo reactor by being further subjected to an appropriate treatment. Further, for example, when the waste catalyst, after the decatalyzing treatment, is present in the form of an inorganic acid salt or organic acid salt dissolved in an aqueous solution in a very dilute concentration, after it is recovered, for example, by an ion-exchanging method or a precipitation method accompanied by a chemical treatment, it must be converted to a state in which it can be used in an oxo reaction after being subjected to a proper treatment. Thus, the generally known conventional catalyst recovering methods have the disadvantages that they require many physical and chemical treatments and they are complicated or require expensive materials.

SUMMARY OF THE INVENTION

The method according to the present invention is based on the idea of extracting and separating the catalyst metal or metals, using an organic extracting medium, from a waste catalyst-containing solution obtained at the time of a decatalyzing treatment such as above described.

That is to say, the present invention relates to the treatment of a catalyst-containing solution separated by the decatalyzing treatment of an oxo reaction product obtained by using (A) a hydroformylating catalyst (oxo reaction catalyst) or (B) a hydroformylating catalyst and a dimerization-dehydration catalyst. The present invention relates to a method of extracting, separating and recovering such a catalyst from a waste catalyst-containing solution by contacting a waste catalyst obtained by the decatalyzing treatment with an alkali metal hydroxide and an organic extracting medium either (1) after converting the waste catalyst to its salt, for example, with a mineral acid when the waste catalyst is in the form of a simple metal or metallic oxide or (2) without converting the waste catalyst to its salt when the waste catalyst is already present in the form of an inorganic acid salt or an organic acid salt dissolved in an aqueous solution. The extract obtained by such a method is comprised of a hydroxide of said catalyst metal suspended in an organic extracting medium and this suspension has excellent properties as regards uniformity, stability, fluidity and catalytic activity.

According to the method of the present invention, by a simple operation, a catalyst metal can be separated and recovered at higher yields and a catalyst suspension which is advantageous as regards safety, fluidity and uniformity can be prepared.

The term "organic extracting medium" used in the present description and claims refers to an organic substance containing a further substance which has surface activity. As the organic substances there are used organic solvents which include (1) oxygen-containing compounds such as alcohols, aldehydes and ethers and (2) hydrocarbons. To these organic solvents there is added a substance having surface activity in order to make the organic extracting medium. As the alcohols, there can be used butanol, pentanol and higher alcohols of $C_6$–$C_{12}$ such as octanol and isooctanol; as the ethers, diethyl ether, dipropyl ether, dibutyl ether and $C_{12}$–$C_{16}$ ether; as the aldehydes, butanal, pentanal and octanal. For the substance having surface activity, there can be selected any known anionic, cationic or nonionic surface active agents irrespective of its ionic classification and can be used in carrying out the present invention. For example, higher fatty acids and their salts such as tall oil, quaternary ammonium salts and polyoxyethylene alkyl ethers can be used as surface active substances. Further, the bottoms of the oxo reaction products, that is, the so-called "bottoms" remaining after the crude product obtained by the oxo reaction which was carried out by using the catalyst in the form of a higher fatty acid salt was decatalyzed and a desired fraction was distilled away, is particularly advantageous for use as such a surface active substance. With regard to the solvent, the effects of alcohols, ethers or hydrocarbons having comparatively higher numbers of carbon atoms are generally remarkable.

For the catalyst-containing solution that can be used in the method of the present invention, there can be enumerated not only a solution containing only a hydroformylating catalyst (the typical catalyst is, for example, a cobalt carbonylation catalyst) but also a solution containing a hydroformylating catalyst and a dimerization-dehydration catalyst. As described above, the oxo reaction system in the presence of a hydroformylating catalyst and a dimerization-dehydration catalyst is known for use in a process for producing an aldehyde and/or an alcohol having 2(n+1) carbon atoms from an olefinic hydrocarbon having n carbon atoms and is well known in industrial practice as the Aldox process. (Such a reaction is proposed, for example, in U.S. Pat. No. 2,811,567 etc.). The present invention is effective to treat a catalyst-containing solution obtained from a process employing such a dimerization-dehydration catalyst as well as from an ordinary oxo process.

The dimerization-dehydration catalyst is a substance consisting mostly of a metal in Group I or II in the Periodic Table of elements and having an aldol condensation activity. Particularly, zinc or magnesium is preferably used as such a catalyst. In carrying out the present invention, a catalyst system consisting mostly of a metal in Group II is particularly proper. The ratio of the dimerization-dehydration catalyst to the hydroformylating catalyst to be used is in the range of 0.1 to 2.0 parts by weight (calculated as the metal) to one part by weight. That is to say, it may be the same as the ratio used in the Aldox process.

Thus, the present invention makes a suspension by extracting and separating a metallic hydroxide, derived from a waste catalyst-containing solution obtained by a decatalyzing treatment by a known process, from said catalyst-containing solution. The obtained suspension can be supplied to an oxo reaction zone or a carbonylating reaction zone for the preparation of a catalyst in a so-called two-step oxo synthesis process so that the reaction may smoothly take place.

The treating conditions in the method of the present invention can be properly selected to prepare the above-described suspension in a favorable condition as regards uniformity, fluidity and stability. The amount of an alkali metal hydroxide added to the waste catalyst-containing solution should be in the range of 70 to 110% by weight of the stoichiometrical amount, based on the amount of the catalyst metal in the waste catalyst-containing solution. As the alkali metal hydroxide there can be used sodium hydroxide or potassium hydroxide. Further, the operating conditions, such as the treating temperature and the concentration of the alkali metal hydroxide solution are not critical. The time of adding the alkali solution and the time of mixing it can be properly determined depending on the other reaction conditions. It is preferable that the organic extracting medium is added in an amount in the range of 20 to 50 times as large as the amount (by weight) of the catalyst metal when the catalyst metal content in the catalyst-containing solution is in the range of 0.05 to 5.0% by weight. More than 0.5% by weight, preferably more than 2% by weight, of a surface active substance is contained in said organic extracting medium.

The procedures used for adding such an organic extracting medium and an alkali metal hydroxide are not critical. The organic extracting medium can be added first and then a solution of the alkali metal hydroxide can be added, or this adding order can be reversed or both can be continuously simultaneously added. The process of adding them can be properly selected depending on the conditions of the operation and apparatus.

Further, we have discovered that the suspension of the catalyst metal hydroxide produced by the extraction and separation according to the method of the present invention has a water content usually of about 10 to 70% by weight depending on the operating conditions of the extraction and separation. Further, when this water is fed particularly to an oxo reaction, it will obstruct said reaction. Therefore it is necessary to remove as much water as possible before the reaction takes place. We have therefore investigated various dehydrating methods. It has been found that such treatments as leaving the suspension to stand, kneading the suspension or centrifugally separating the suspension do not provide a sufficient dehydrating effect and the water content can be reduced thereby to only about 15 to 8% by weight. If it is attempted to reduce the water content below that by the same procedures, an abnormal viscosity rise will occur, a sludge will be produced and therefore it is impossible to remove more water. As a result of making further investigations, we have discovered that the water content of the suspension, by distillation or evaporation, can be reduced to a value below 4.0% by weight and that the dehydrated suspension having such a low water content has very peculiar and useful physical and chemical properties.

The product obtained by a dehydrating treatment, for example, by distillation or evaporation, as aforesaid, is a liquid in which a metallic hydroxide, finely granulated to be of about several tens of millimicrons in size, is suspended in the organic extracting medium. It is remarkably different in physical and chemical properties from the suspension before the dehydrating treatment was carried out. In an industrial operation for treating such a suspension, the storage stability, uniformity, conveying performance and hydroformylating or metal carbonylating reactivity are particularly important characteristics. In the product obtained by the dehydrating method of the present invention, it is possible to remarkably improve these characteristics as compared with the properties of the suspension before the dehydrating treatment. These remarkable characteristics are indicated by the results listed in the following table:

| Characteristics | Before the dehydrating treatment | After the dehydrating treatment |
|---|---|---|
| Stickiness | Non-Newtonian flow (rocking and varying). | Newtonian flow. |
| Viscosity [1] (in poises) | 1.61 | 0.16. |
| Syneresis | Present | Absent. |
| Storage stability | Rather low | Very high. |
| Uniformity | High | Do. |
| Conveying performance | A specific operation is required for fluidization. | No specific operation is required. |
| Reactivity [2] | Rather low | Very high. |

[1] The suspension before the dehydrating treatment shows a plastic viscosity. That is to say, $\mu_0=16.2$ and $\mu_\infty=1.61$ at a measuring temperature of 25° C.
[2] When the organic extracting medium is used as a solvent, the so-called catalytic activity of the following-named catalysts, when used as a hydroformylating reaction catalyst, increases in the following order (1) cobalt hydroxide (reagent), (2) the suspension before the dehydrating treatment and (3) the suspension after the dehydrating treatment. This dehydrated suspension shows a catalytic activity which is comparable to or higher than the activity of a cobalt fatty acid salt.

In order to attain the above-mentioned dehydration of the suspension, a distilling process or an evaporating process can be carried out. In an azeotropic distilling process, a hydrous suspension to which is added as azeotropic agent in an amount 1 to 10 times as large as the volume of water contained in the suspension may be heated to distill away the water together with the organic solvent. For the azeotropic agent, an alcohol or a hydrocarbon used in conventional azeotropic distillations can be used. The treating condition involves heating the azeotrope to a temperature to about 200° C. For the distillation, either a batch-type distillation or a continuous-type distillation can be used. As an example of a continuous-type process, there can be mentioned a process wherein, for example, a hydrous suspension is mixed and preheated together with an azeotropic agent and then is passed through a distillation column filled with various fillers or provided with trays. Alternatively, the hydrous suspension can have a previously dehydrated suspension mixed with it and distilled without using an azeotropic agent.

When an evaporating process is used to remove water, a hydrous suspension has a previously dehydrated suspension mixed with it, with or without the addition of an azeotropic agent, and the mixture is subjected to a corresponding evaporation operation. When the evaporation process is carried out on a continuous basis, there can be used, for example, a process wherein a hydrous suspension has an azeotropic agent mixed with it, the mixture is heated and is put into a flash drum, the water and the azeotropic agent are evaporated and are cooled and recovered in a condenser, and the dehydrated suspension is taken out of said system. Alternatively there can be used a process wherein a hydrous suspension has a previously dehydrated suspension cyclically mixed with it and treated in the same manner. Further, this operation may be carried out under atmospheric pressure or a reduced pressure and it can be carried out under the operating conditions which are used in the above-described distillation process.

As described above, the present invention is characterized by obtaining a suspension low in water content and high in reactivity by (1) decatalyzing by a conventional process a reaction product obtained by using a hydroformylating catalyst or a reaction product obtained by using a hydroformylating catalyst and a dimerization-dehydration catalyst, and (2) extracting and separating the catalyst as a hydroxide from the separated waste catalyst-containing solution, and preferably dehydrating the hydrous suspension of the catalyst hydroxide.

The recovered catalyst obtained by carrying out the present invention is supplied to a metal carbonylating process or to an oxo reaction process (including an Aldox process) and can accomplish a very remarkable reaction accelerating effect.

EXAMPLE 1

500 g. of a waste cobalt catalyst-containing solution (of a cobalt concentration of 0.6% by weight) separated at the time of the decatalyzing treatment of an oxo reaction product (said decatalyzing treatment was carried out by adding an acetic acid aqueous solution to said oxo reaction product, heating it to 100° C. for 60 minutes and removing the separated water layer) and 100 g. of a distillation residue (see note 1 of Table) of an oxo reaction product, as an organic extracting medium, were added into a bottom-draining beaker of a capacity of one liter and then 40 ml. of an aqueous solution of 10% sodium hydroxide were added to the contents while stirring them. The stirring was continued for 30 minutes, then the contents were left standing for 30 minutes, the separated water layer was drained from the lower part, the slurry of cobalt hydroxide was water washed with 250 ml. of ion exchanging water and the remaining sodium hydroxide and sodium salt were removed.

As a result, a cobalt hydroxide slurry of a water content of 14.0% by weight and a viscosity of 0.29 poise (0.29 poise) (see note 2 of Table 1) was obtained at a cobalt-extracting rate of 98.5% by weight.

EXAMPLE 2

500 g. of a waste catalyst solution (of 0.6% by weight of cobalt and 0.3% by weight of zinc) separated at the time of a decatalyzing treatment (same as in Example 1), 142 g. of a distillation residue (see note 1 of Table 2) of an oxo reaction product, as an organic extracting medium, and 60 ml. of an aqueous solution of 10% sodium hydroxide were used and otherwise the same treatment as in Example 1 was carried out. Cobalt was separated at an extraction rate of 98.5% by weight, zinc was separated at an extraction rate of 100% by weight and a cobalt/zinc hydroxide slurry of a water content of 25.4% by weight and viscosity of 1.72 poise (0.78 poise) was obtained.

EXAMPLE 3

Treatments were carried out under the same conditions as in Example 2 except that the organic extracting mediums listed in the following Table 1 were used. The results listed in Table 1 were obtained.

TABLE 1

| Organic extracting media | | Water content of slurry (in percent by by weight) | Metal extracting rate (in percent by by weight) |
|---|---|---|---|
| Organic solvents | Surface active agents (Note 3) | | |
| Naphtha | None | (¹) | 0 |
| Isobutanol | do | (¹) | 0 |
| Isooctanol | do | (¹) | 0 |
| Naphtha | Tall oil (anionic) | 60.0 | 90.4 |
| Isooctanol | do | 20.9 | 96.5 |
| Do | Kotamin 86D (Note 4) | 49.3 | 80.0 |
| Do | Phenyl-β-naphthylamine (cationic) | 53.0 | 50.0 |
| Do | Polyoxyethylene alkyl ether (nonionic) | 47.2 | 80.0 |
| Do | Sorbitan monooleate (nonionic) | 45.0 | 50.0 |

¹ Water layer separated and not good.
NOTES.—1. A kettle residue (bottoms) after the fraction below 180° C. was removed from the product after the decatalyzing treatment, said product having been obtained by using metallic soaps of cobalt and zinc as oxo reaction catalysts. 2. A value obtained by measuring the viscosity at 25° C. with a rotary viscosimeter. (The value in the parentheses is a value when a stationary state was obtained by increasing the number of revolutions.) 3. The surface active agent was contained in an amount of 2% by weight in the organic extracting medium. 4. Trade name of a quaternary ammonium salt-type surface active agent manufactured by Kao Soap Co., Ltd., Japan.

EXAMPLE 4

An aqueous solution of sodium hydroxide and a distillation residue or bottoms (see note 1 of Table 2) of an oxo reaction product, as an organic extracting medium, were added to a waste cobalt and zinc catalyst-containing solution separated at the time of the decatalyzing treatment of an oxo reaction product. An azeotropic agent was added to the suspension (Note 2) of the produced cobalt/zinc hydroxide and the suspension was distilled. The results listed in Table 2 were obtained.

TABLE 2

| No. | Azeotropic agents | Azeotropic agent/suspension (in percent by weight) | Distilling temperature (in ° C.) | Time (in hours) | Water content of distillation product (in percent by weight) |
|---|---|---|---|---|---|
| 1 | Naphtha (55–70° C.) | 70 | 103–151 | 5 | 1.13 |
| 2 | Isooctanol | 80 | 130–195 | 5 | 0.49 |
| 3 | Isobutanol | 80 | 113–160 | 6 | 0.55 |
| 4 | do | 160 | 145–190 | 1.5 | 0.81 |

NOTES:—1. A kettle residue after the fraction below 180° C. was removed from the product after the decatalyzing treatment, said product having been obtained by using metallic soaps of cobalt and zinc as oxo reaction catalysts. 2. Of a water content of 31.6% by weight, cobalt/zinc weight ratio of 2/1 and cobalt/extracting solvent of 2% by weight.

When a carbonylating reaction was carried out under 200 atmospheres pressure using a synthetic gas (of $H_2/CO=1/1$) in an autoclave of 500 cc. volume using the above-mentioned distillation product (experiment No. 2 in Table 2), the reaction ended at 135° C. in three hours and the yield of carbonyl was 100%. When a cobalt/zinc tall acid salt or commercial cobalt/zinc hydroxide was used under the same conditions, even at 135° C. in six hours, no reaction occurred.

EXAMPLE 5

The same suspension of a cobalt/zinc hydroxide as in Example 4 or the same suspension to which the product having had the water distilled and removed had been added had the water evaporated by a forced circulating process, the results listed in Table 3 were obtained.

TABLE 3

| Distillate/ suspension (in weight/ weight) | Feed (in cc./ hr.) | Heating area (in cm.²) | Heating temperature (in ° C.) | Water content of evaporation product (in percent) |
| --- | --- | --- | --- | --- |
| 1 | 0 | 600 | 170 | 110 | 3.56 |
| 2[1] | 0 | 600 | 170 | 150 | 1.82 |
| 3 | 1 | 1200 | 320 | 120 | 2.09 |

[1] Evaporation under a reduced pressure of 160 mm. Hg.

In the above-mentioned product (Experiment No. 2 in Table 3), the carbonylation reaction proceeded so fast that, when the reaction was carried out under a pressure of 200 atmospheres of a synthetic gas (of $H_2/CO=1/1$), the reaction starting temperature was as listed in Table 4.

TABLE 4

| Catalysts | Cobalt hydroxide (commercial) | Undehydrated suspension, ° C. | Dehydrated suspension, ° C. |
| --- | --- | --- | --- |
| None | No reaction occurred until 200° C. | 200 | 169 |
| Palladium supported on carbon carrier.[1] | 125° C. | 117 | 91 |

[1] The amount of palladium supported on the carrier was 5.0% and the amount the catalyst used was 5.0%.

EXAMPLE 6

A suspension of cobalt hydroxide had water evaporated from it by a forced circulating process by the same method as described in Example 5 and the results listed in Table 5 were obtained.

TABLE 5

| Distillate/ suspension (weight ratio) | Feed (in cc./hr.) | Heating area (in cm.²) | Heating temperature (in ° C.) | Water content of evaporation product (in percent) |
| --- | --- | --- | --- | --- |
| 1 | 0 | 500 | 170 | 130 | 4.25 |
| 2 | 0 | 500 | 170 | 140 | 2.51 |
| 3 | 1/10 | 400 | 170 | 140 | 1.80 |

In the above-mentioned product (Experiment No. 3 in Table 5), the carbonylation reaction proceeded so fast that, when the reaction was carried out under a pressure of 200 atmospheres of a synthetic gas (of $H_2/CO=1/1$), the reaction starting temperature was as listed in Table 6.

TABLE 6

| Catalysts | Cobalt hydroxide (commercial) | Undehydrated suspension | Dehydrated suspension |
| --- | --- | --- | --- |
| None | 150° C. in 3 hours | 150° C. in 2 hours | 150° C. |
| Palladium-carbon carrier [1] | 100° C. | 95° C. | 74° C. |

[1] The amount of palladium was 5.0% and the amount of the catalyst used was 5.0%.

EXAMPLE 7

When the dehydrated suspension of Example 5 or 6, 0.22 g. of cobalt, 100 ml. of n-hexane as a solvent and 40 g. of propylene as an olefin were fed into an autoclave of 500 cc. volume and a synthetic gas (of $H_2CO=1.2$) was introduced under an initial pressure of 150 kg./cm.² and the contents were heated at a temperature elevating velocity of 0.8° C. per minute, a reaction started at the following reaction starting temperature and ended within one hour and a yield of more than 95% was obtained.

Reaction starting temperature (in °C.)

Cobalt suspension (of a water content of 1.82) _____ 148 [1](170)
Cobalt/zinc suspension (of a water content of 1.80%) _____ 154 [1](160)

[1] The values in the parentheses are of the case of using an oleic acid salt and are shown for comparison purposes.

What is claimed is:

1. A process for recovering catalyst metal selected from the group consisting of (a) cobalt catalyst or (b) a mixture of cobalt catalyst and a dimerization-dehydration catalyst consisting of a salt of a metal selected from the metals in Group II in the Periodic Table, which comprises treating an oxo reaction product containing catalyst metal with an aqueous solution of an inorganic or an organic acid to convert the catalyst metal to salt form, removing from the oxo reaction product the resulting waste catalyst metal-containing acidic aqueous solution, adding to said solution an alkali metal hydroxide and a liquid organic extracting medium containing organic surface active agent, said liquid organic extracting medium being added in an amount in the range of 20 to 50 times the weight of the catalyst metal and being selected from the group consisting of alcohols, aldehydes, ethers and hydrocarbons, said surface active agent being added in an amount of more than 0.5% by weight based on the weight of said liquid organic extracting medium and being selected from the group consisting of higher fatty acids and salts thereof, quaternary ammonium salts, and polyoxyethylene alkyl ethers, separating from said waste catalyst metal-containing solution said catalyst metal in hydroxide form suspended in said organic extracting medium, adding to said suspension an azeotropic agent in an amount from about 1 to 10 times the volume of water contained in the suspension, and then azeotropically distilling the mixture to remove water therefrom in order to obtain a suspension of catalyst metal hydroxide containing less than about 4.0% by weight of water.

2. The process according to claim 1, wherein said dimerization-dehydration catalyst is a zinc salt.

(References on following page)

References Cited

UNITED STATES PATENTS

| | | | |
|---|---|---|---|
| 2,757,206 | 7/1956 | Jones et al. | 260—604 |
| 2,802,846 | 8/1957 | Mertzweiler | 260—638 X |
| 2,811,567 | 9/1957 | Mason | 260—638 |
| 3,153,673 | 10/1964 | Roming, Jr. | 260—638 |
| 3,188,351 | 6/1965 | Lemke | 260—604 |
| 3,378,590 | 4/1968 | Usami et al. | 252—430 |

DANIEL E. WYMAN, Primary Examiner

P. E. KONOPKA, Assistant Examiner

U.S. Cl. X.R.

252—412, 413, 430; 260—638 HF, 604 HF, 598